(12) United States Patent
Matsukuma (10) Patent No.: US 7,861,810 B2
(45) Date of Patent: Jan. 4, 2011

(54) MOBILE BODY

(75) Inventor: Kenji Matsukuma, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 12/718,995

(22) Filed: Mar. 7, 2010

(65) Prior Publication Data

US 2010/0155155 A1    Jun. 24, 2010

Related U.S. Application Data

(63) Continuation of application No. PCT/JP2008/067137, filed on Sep. 24, 2008.

(30) Foreign Application Priority Data

| Oct. 17, 2007 | (JP) | ............................. 2007-270450 |
| May 30, 2008 | (JP) | ............................. 2008-143290 |

(51) Int. Cl.
*B62B 3/00* (2006.01)
(52) U.S. Cl. ..................................................... 180/19.3
(58) Field of Classification Search ................ 180/19.1, 180/19.2, 19.3
See application file for complete search history.

(56) References Cited

U.S. PATENT DOCUMENTS

| 3,731,756 A | * | 5/1973 | Hajec ........................... 180/6.5 |
| 3,989,116 A | * | 11/1976 | Hirano ......................... 180/19.3 |
| 4,615,406 A | * | 10/1986 | Bottenschein et al. ...... 180/19.1 |

FOREIGN PATENT DOCUMENTS

| JP | 06-144247 | 5/1994 |
| JP | 07-108845 | 4/1995 |
| JP | 08-207850 | 8/1996 |
| JP | 08-282498 | 10/1996 |
| JP | 11-265211 | 9/1999 |
| JP | 2002-315787 | 10/2002 |
| JP | 2007-062622 | 3/2007 |

\* cited by examiner

*Primary Examiner*—Kevin Hurley
(74) *Attorney, Agent, or Firm*—Ditthavong Mori & Steiner, P.C.

(57) ABSTRACT

A mobile body includes a string body that can be pulled out from and retracted into a main body, a length measurement device configured to measure a pull-out length by which the string body is pulled out, and an angle measurement device configured to measure an angle of the string body with respect to the main body. A drive unit is controlled on the basis of the results of the measurements performed by the length measurement device and the angle measurement device.

5 Claims, 8 Drawing Sheets

ســMOBILE BODY

CROSS-REFERENCE TO RELATED APPLICATIONS

The present application is a continuation application of PCT/JP2008/067137, filed Sep. 24, 2008, which claims priority to Japanese Patent Application No. 2007-270450, filed Oct. 17, 2007, and Japanese Patent Application No. 2008-143290, filed May 30, 2008. The contents of these applications are incorporated herein by reference in their entirety.

BACKGROUND OF THE INVENTION

1. Field of the Invention

The present invention relates to a mobile body used for carrying objects in factories, offices, hospitals, welfare institutions, and other facilities.

2. Discussion of the Background

Hand trucks are used to carry objects. A force required to push the hand trucks increases along with the weight of the objects placed on the hand trucks, and there is a disadvantage that a heavy burden is imposed on the user accordingly. To overcome such a disadvantage, Japanese Unexamined Patent Application Publication No. 11-265211 discloses a so-called power-assisted carrier, which is a hand truck including a mobile body provided with a power source, such as a battery, and a driving unit, such as a motor. The power-assisted carrier is moved by controlling the driving unit in response to an operation of an operating unit.

SUMMARY OF THE INVENTION

According to one aspect of the present invention, a mobile body includes a main body; a drive unit configured to drive the main body; an operating unit with which the main body is operated; and a control unit configured to control the drive unit on the basis of an amount of operation applied to the operating unit. The operating unit includes a pulley around which a string body is wound, a power spring configured to urge the pulley in a direction such that the string body is wound around the pulley, a first rotational-angle detector configured to measure an amount of rotation of the pulley, a fixing part configured to fix the first rotational-angle detector, and a second rotational-angle detector configured to measure an amount of rotation between the fixing part and the main body. The control unit includes the string body that can be pulled out from and retracted with respect to the main body, a length measurement device configured to measure a pull-out length by which the string body is pulled out, and an angle measurement device configured to measure an angle of the string body with respect to the main body. The control unit controls the drive unit on the basis of the results of the measurements performed by the length measurement device and the angle measurement device, and stops the drive unit if the string body is pulled out by a predetermined length or more.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Embodiments will now be described with reference to the accompanying drawings, wherein like reference numerals designate corresponding or identical elements throughout the various drawings.

First Embodiment

Figure 1:
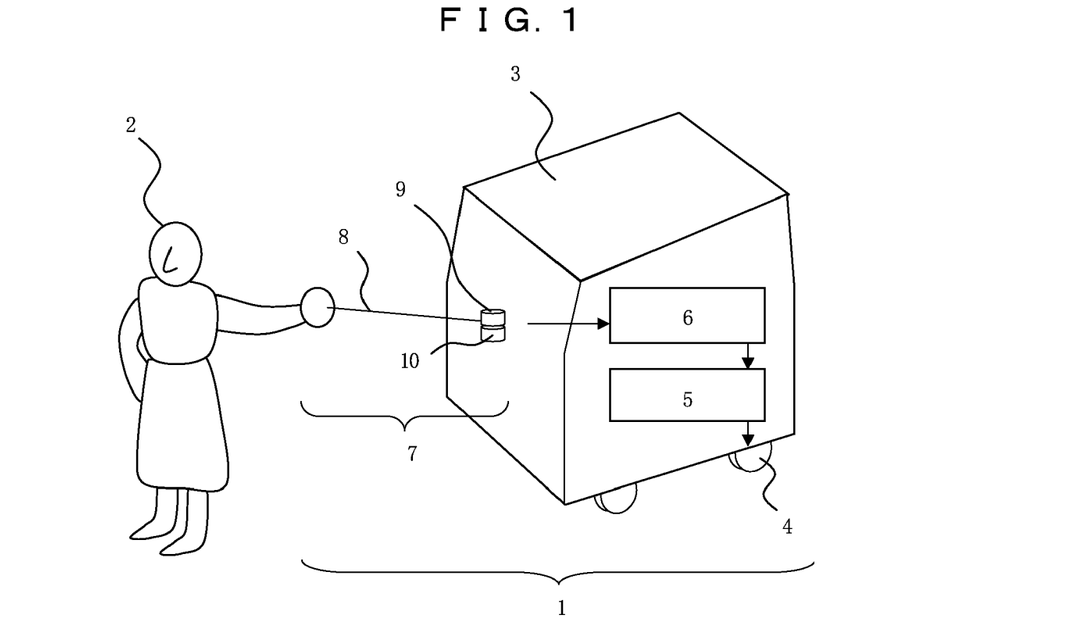
FIG. 1 is a perspective view illustrating a first embodiment of the present invention.

FIG. 1 is a perspective view illustrating a first embodiment of the present invention. FIG. 1 shows a mobile body 1 and an operator 2 who operates the mobile body 1. A main body 3 functions as a housing of the mobile body 1, and drive wheels 4 are mounted on the main body 3. The drive wheels 4 allow the mobile body 1 to move along a floor surface. A drive unit 5 rotates the drive wheels 4, and a control unit 6 controls the drive unit 5. The drive unit 5 and the control unit 6 are installed in the main body 3. The mobile body 1 is operated by the operator 2 through an operating unit 7. The operating unit 7 is mounted on a surface of the main body 3. An amount of operation by which the operating unit 7 is operated by the operator 2 is transmitted to the control unit 6. The control unit 6 calculates rotational speeds to be generated at the drive wheels 4 on the basis of the amount of operation, and applies a control command to the drive unit 5.

Figure 2:
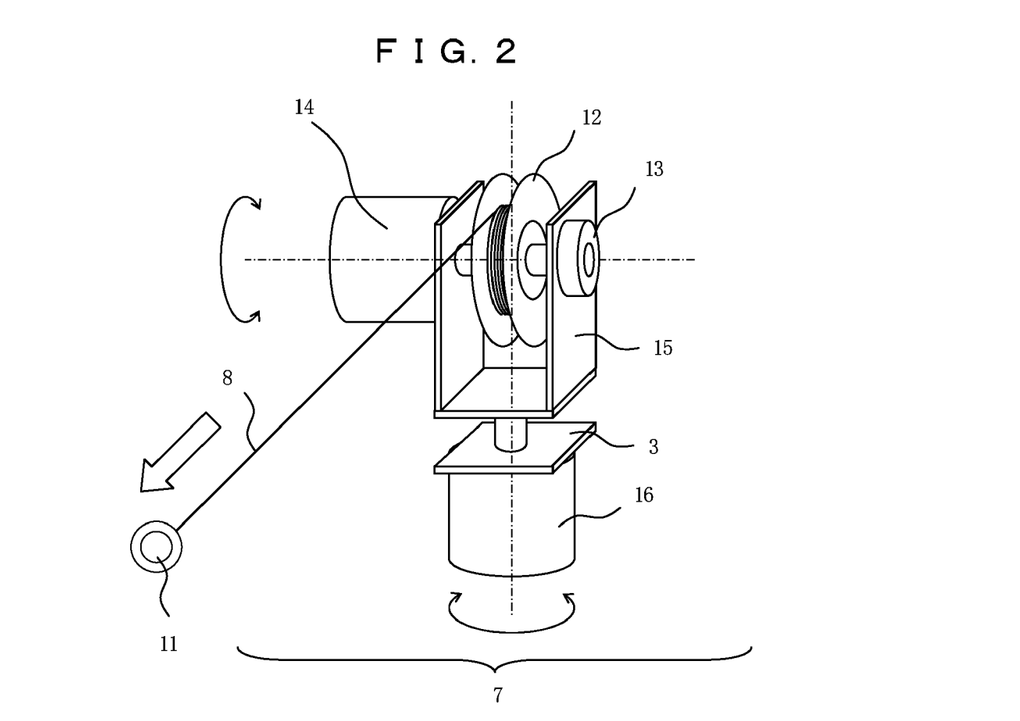
FIG. 2 illustrates an example of the structure of an operating unit according to the first embodiment of the present invention.

FIG. 2 illustrates an example of the structure of the operating unit 7 according to the first embodiment of the present invention. Referring to FIG. 2, a handle 11 is fixed to a string body 8 at an end thereof. The other end of the string body 8 is fixed to a pulley 12, and the string body 8 is wound around the pulley 12. The pulley 12 is urged by a power spring 13 in a direction such that the string body 8 is wound around the pulley 12. The rotational speed or the rotational angle (the rotational speed and the rotational angle) of the pulley 12 is detected by a first rotational-angle detector 14. The pulley 12, the power spring 13, and the first rotational-angle detector 14 constitute a length measurement device 9 for measuring a pull-out length by which the string body 8 is pulled out. The first rotational-angle detector 14 is fixed to a fixing part 15, and the fixing part 15 is attached to a portion of the main body 3 such that the fixing part 15 is rotatable along a horizontal plane. The rotational angle of the fixing part 15 with respect to the main body 3 is detected by a second rotational-angle detector 16. The fixing part 15 and the second rotational-angle detector 16 constitute an angle measurement device 10.

In the above-described structure, if the operator 2 grabs the handle 11 and pulls the handle 11 with a strong force in a direction shown by the arrow in FIG. 2, the pulley 12 is rotated against the urging force applied by the power spring 13 in a direction such that the string body 8 is pulled out from the pulley 12. Conversely, if the force by which the handle 11 is pulled in the direction shown by the arrow is reduced, the pulley 12 is rotated by the urging force applied by the power spring 13 in a direction such that the string body 8 is wound around the pulley 12. The pull-out length of the string body 8 can be determined by detecting the rotation of the pulley 12 with the first rotational-angle detector 14. The angle of the string body 8 with respect to the main body 3 can be determined by detecting the rotational angle of the fixing part 15 relative to the main body 3 with the second rotational-angle detector 16.

The string body 8 may be made of any type of material, such as a steel wire, a resin wire, or a woven string, as long as the material is strong and has small elasticity. The handle 11 has an annular shape so that the operator 2 can grab the handle 11 by the hand or fingers. An encoder is preferably used as the first rotational-angle detector 14. An encoder, a potentiometer, or the like is preferably used as the second rotational-angle detector 16. Although not shown in the figures, a power spring may be disposed between the fixing part 15 and the main body 3 such that a neutral point is located near the front side of the main body 3. In such a case, the string body 8 can be urged in a direction such that the string body 8 extends forward from the main body 3.

Figure 3:
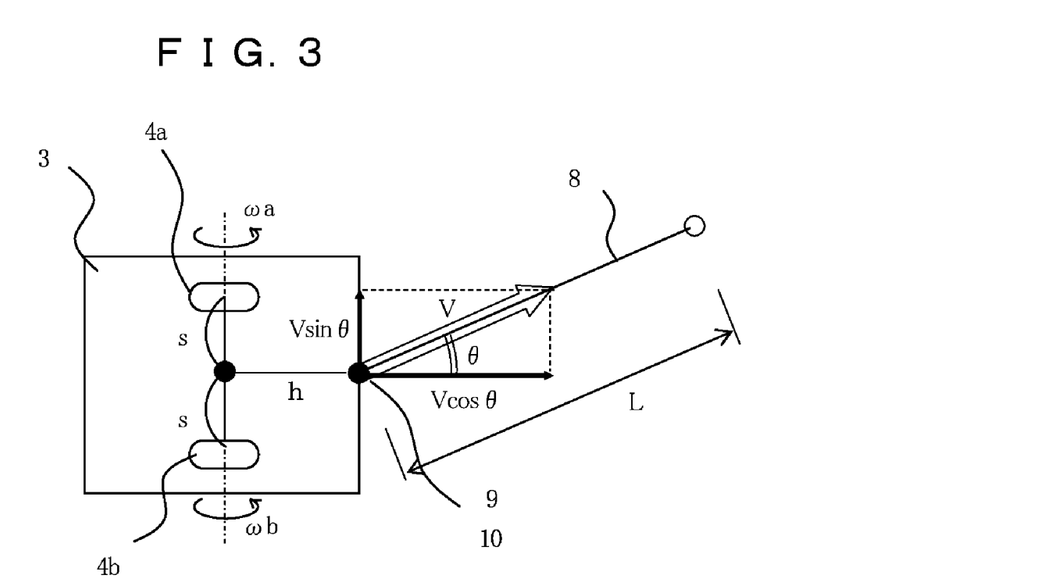
FIG. 3 is a top view illustrating command velocities applied to a mobile body according to the first embodiment of the present invention.

The relationship between the movement of the mobile body 1 and the measurement results obtained by the length measurement device 9 and the angle measurement device 10 will now be described. FIG. 3 is a top view illustrating command velocities applied to the mobile body 1 according to the first embodiment of the present invention. In the present embodiment, two drive wheels 4a and 4b are disposed in a central area of the main body 3, and a so-called two-wheel differential drive method is used. The mobile body 1 moves straight when the drive wheels 4a and 4b are rotated at the same angular velocity, and the mobile body 1 turns when the drive wheels 4a and 4b are rotated at different angular velocities. In FIG. 3, L shows the pull-out length of the string body 8 that is detected by the length measurement device 9. In addition, θ shows the angle between the string body 8 and the main body 3 that is detected by the angle measurement device 10. First, the magnitude of a velocity vector V to be generated by the main body 3 is determined on the basis of the pull-out length L of the string body 8. The direction of the velocity vector V to be generated corresponds to the angle θ. The velocity vector V to be generated can be divided into a velocity component $V \cos \theta$ in a travelling direction of the main body 3 and a velocity component $V \sin \theta$ in a turning direction of the main body 3. Here, r represents the radius of the drive wheels 4a and 4b, s represents the distance from the center of the main body 3 to the centers of the drive wheels 4a and 4b, and h represents the distance from the center of the main body 3 to the length measurement device 9 and the angle measurement device 10. The rotational angular velocities $\omega a1$ and $\omega b1$ to be generated at the drive wheels 4a and 4b to generate the velocity component $V \cos \theta$ in the travelling direction can be obtained as in Expression (1) given below. The sign of the rotational angular velocities of the drive wheels 4a and 4b is defined as positive in the case where the mobile body 1 is moved forward (in the direction shown by the arrow in FIG. 3).

$$\omega a1 = V \cos \theta / r$$

$$\omega b1 = V \cos \theta / r \qquad (1)$$

Similarly, the rotational angular velocities ωa2 and ωb2 to be generated at the drive wheels 4a and 4b to generate the velocity component $V \sin \theta$ in the turning direction can be obtained as follows:

$$\omega a2 = -s \times V \sin \theta / (rh)$$

$$\omega b2 = s \times V \sin \theta / (rh) \qquad (2)$$

The total rotational angular velocities ωa and ωb to be generated at the drive wheels 4a and 4b can be determined by adding the above-described components as follows:

$$\omega a = \omega a1 + \omega a2 \qquad (3)$$
$$= (V \cos \theta / r) - (s \times V \sin \theta / (rh))$$
$$\omega b = \omega b1 + \omega b2$$
$$= (V \cos \theta / r) + (s \times V \sin \theta / (rh))$$

Figure 4:
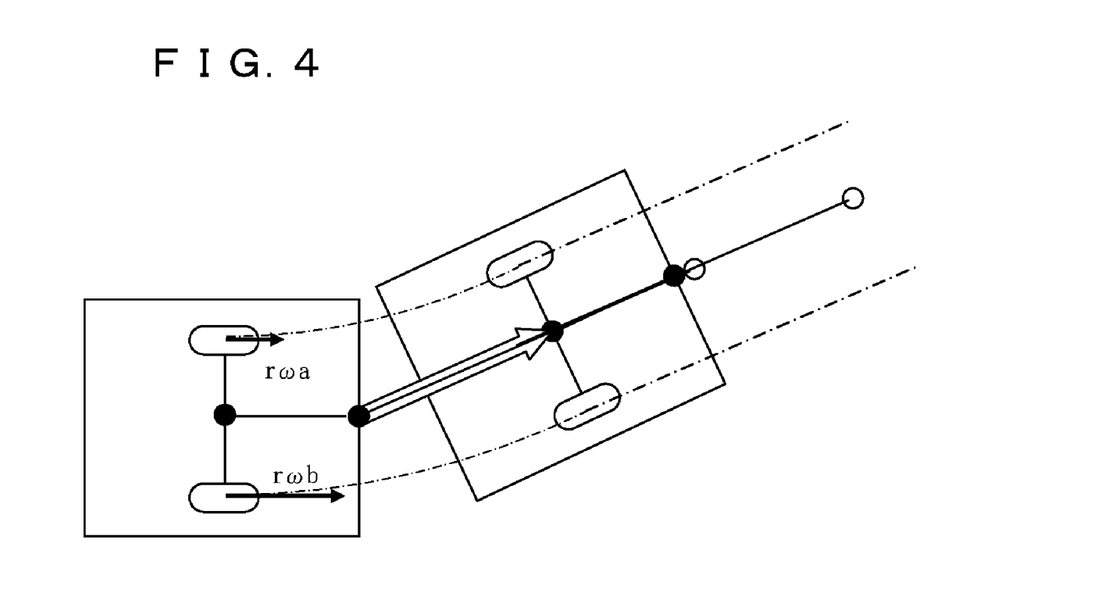
FIG. 4 is a top view illustrating the movement of the mobile body according to the first embodiment of the present invention.

FIG. 4 is a top view illustrating the movement of the mobile body 1 according to the first embodiment of the present invention. As described above, the rotational angular velocities to be generated at the drive wheels 4a and 4b are determined on the basis of the magnitude V of the velocity to be generated in accordance with the pull-out length L of the string body 8 and the angle θ between the string body 8 and the main body 3. Then, the drive wheels 4a and 4b are controlled on the basis of the determined rotational angular velocities. Accordingly, velocities rωa and rωb are generated at the points where the drive wheels 4a and 4b are in contact with the floor surface and the mobile body 1 moves forward such that the orientation thereof is changed so as to follow the string body 8. Thus, the mobile body 1 is moved as if the mobile body 1 is pulled by the string body 8. Therefore, it is not necessary for the operator 2 to have a special knowledge and anyone can easily and intuitively operate the mobile body 1 as if to "pull a truck with a spring." In addition, there is no projection on the surface of the main body 3, and the string body 8 simply becomes slack if the mobile body 1 and the operator 2 suddenly approach each other. Therefore, the operator 2 can be prevented from colliding with a projection on the operating unit 7, and the safety can be ensured. In addition, in the case where the operating unit 7 is structured as shown in FIG. 2, the operation stroke can be increased by increasing the length of the string body 8 wound around the pulley 12 within a range determined by the pulley radius and the pulley width. Accordingly, a range in which a sensitive operation can be performed can be increased. In addition, since the string body 8 is stored in a wound state, the size of the operating unit 7 can be reduced.

Figure 5:
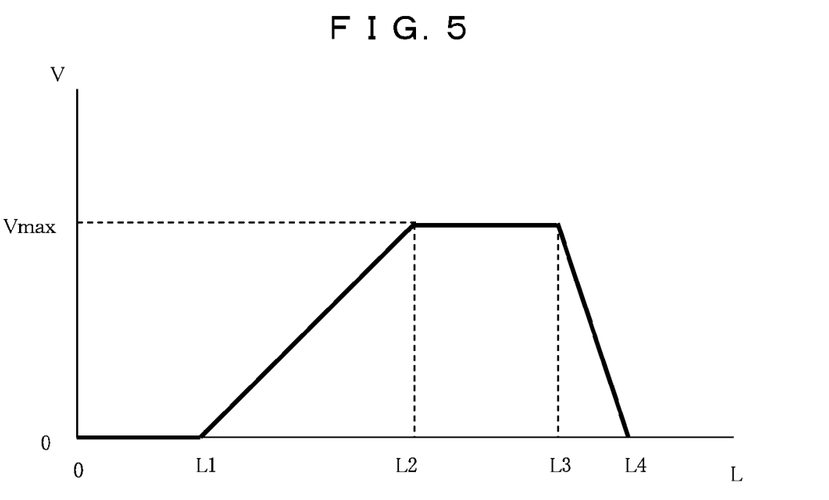
FIG. 5 is a graph of the relationship between the pull-out length of a string body and the velocity of a main body according to the first embodiment of the present invention.

FIG. 5 is a graph of the relationship between the pull-out length of the string body 8 and the velocity of the main body 3 according to the first embodiment of the present invention. The horizontal axis shows the pull-out length L of the string body 8, and the vertical axis shows the magnitude of the velocity vector V to be generated by the main body 3. In the state in which the string body 8 is completely wound around the pulley 12 (when L=0), the velocity V is also 0 (V=0) and the mobile body 1 is stationary. If the operator 2 gradually pulls out the string body 8 and the pull-out length L exceeds a predetermined value L1, the velocity V is generated and the mobile body 1 starts to move. The velocity V is increased if the pull-out length L is increased with respect to the predetermined value L1, and is reduced if the pull-out length L is reduced. Therefore, if the operator 2 moves forward while pulling the string body 8, the mobile body 1 is caused to follow the operator 2 so as to maintain the pull-out length L constant. If the pull-out length reaches a predetermined value L2 and the velocity V reaches a predetermined maximum velocity Vmax of the mobile body 1, the mobile body 1 is caused to move at a constant speed Vmax. Then, if the pull-out length L exceeds a predetermined value L3, the velocity V is reduced. If the pull-out length L reaches a maximum pull-out length L4, the mobile body 1 is caused to stop. Therefore, the operator 2 can stop the mobile body 1 either by releasing the string body 8 so that the string body 8 is retracted by the power spring 13 and the pull-out length L is reduced to the predetermined value L1 or, conversely, by strongly pulling out the string body 8 so that the pull-out length L reaches the predetermined value L4. Accordingly, in an emergency, the operator 2 can stop the mobile body 1 by a simple method.

Second Embodiment

A second embodiment of the present invention will now be described. In the present embodiment, the handle 11 is provided with a switch that can be depressed by the operator 2. Information regarding the ON/OFF state of the switch is transmitted to the control unit 6 through a pair of electric wires disposed in the string body 8. The control unit stores the pull-out length of the string body 8 at the time when the switch is depressed and then released as a neutral length L5. In an operating process, the operator 2 pulls out the string body 8 while depressing the switch on the handle 11, and then releases the switch when the pull-out length L reaches a desired pull-out length L5. Accordingly, the pull-out length L5 is stored. After the pull-out length L5 is stored, the mobile body 1 can be moved forward if the pull-out length L is increased beyond L5 and backward if the pull-out length L is reduced to below L5.

Figure 6:
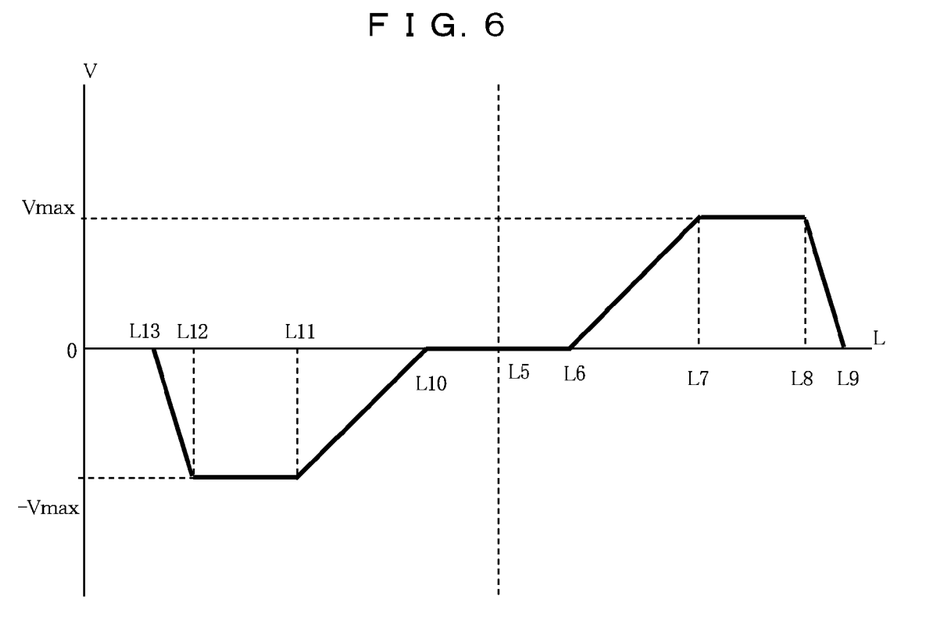
FIG. 6 is a graph of the relationship between the pull-out length of the string body and the velocity of the main body according to a second embodiment of the present invention.

FIG. 6 is a graph of the relationship between the pull-out length L of the string body 8 and the velocity V of the main body 3 according to the second embodiment of the present invention. If the pull-out length L is increased beyond L5 in the positive direction and exceeds a predetermined value L6, a velocity V is generated in the positive direction so that the mobile body 1 starts to move forward. After the pull-out length L reaches a predetermined value L7 and the velocity reaches the maximum velocity Vmax, the maximum velocity Vmax is maintained. Then, the velocity is reduced if the pull-out length L is increased beyond a predetermined value L8, and the mobile body 1 is stopped if the pull-out length L reaches a predetermined value L9. If the pull-out length L is reduced beyond L5 in the negative direction and becomes smaller than a predetermined value L10, a velocity −V is generated in the negative direction so that the mobile body 1 starts to move backward. After the pull-out length L is reduced to a predetermined value L11 and the velocity reaches the maximum velocity −Vmax, the maximum velocity −Vmax is maintained. Then, the velocity is reduced if the pull-out length L becomes smaller than a predetermined value L12, and the mobile body 1 is stopped if the pull-out length L is reduced a predetermined value L13. With the above-described structure, the mobile body 1 can be moved not only forward but also backward. When the string body 8 is to be retracted, the operator 2 loosens the handle 11 so that the pull-out length L of the string body 8 is reduced to below L13. Accordingly, the mobile body 1 is stopped.

Third Embodiment

Figure 7:
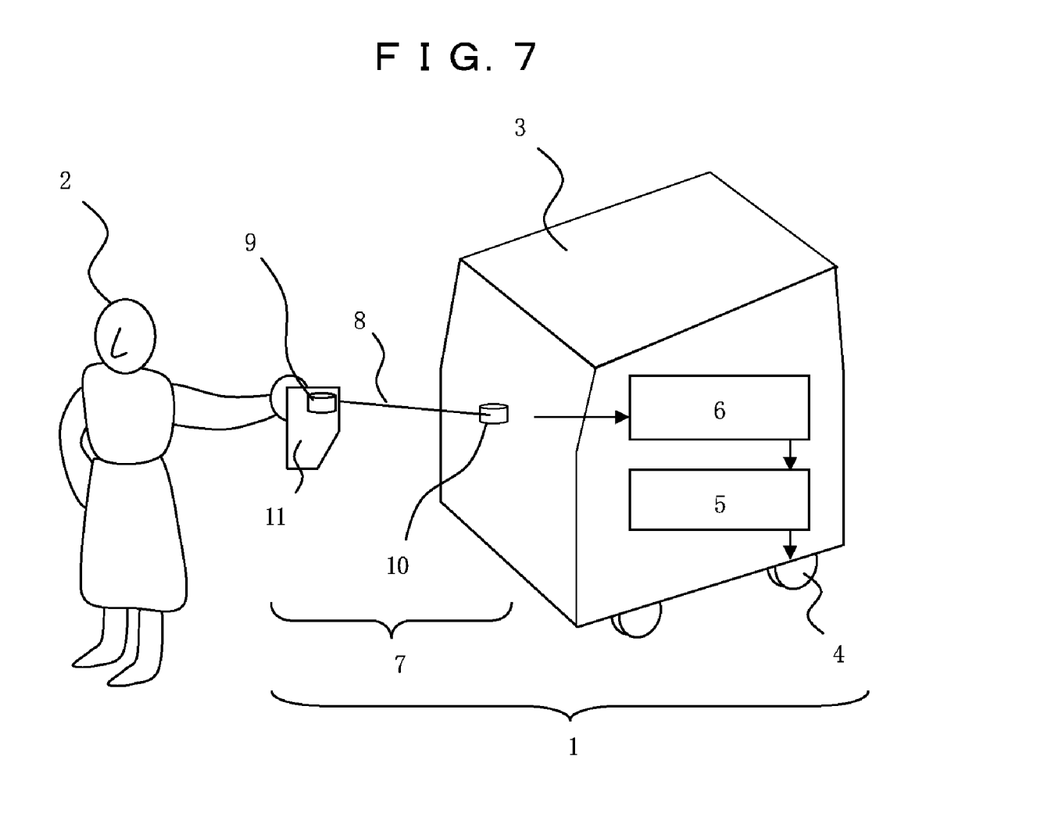
FIG. 7 is a perspective view illustrating a third embodiment of the present invention.

FIG. 7 is a perspective view illustrating a third embodiment of the present invention. As shown in FIG. 7, the length measurement device 9 may be mounted on the handle 11 in stead of the main body 3. The measurement result obtained by the length measurement device 9 is transmitted to the control unit 6 through electric wires disposed in the string body 8. In the present embodiment, power supply wires for supplying power to the length measurement device 9 and transmission wires (transmission through analog signals or communication) for transmitting the measurement result from the length measurement device 9 are disposed in the string body 8. According to the present embodiment, only the angle measurement device 10 in the operating unit 7 is attached to the main body 3. Therefore, the size of the component attached to the main body 3 can be further reduced.

Movements of the hand generated when the operator 2 moves while pulling the mobile body 1 can be compensated for by placing a filter in the control unit 6 and eliminating high-frequency components. Either an electric circuit or software can be used as the filter. In the foregoing embodiments, the string body 8 is made of a material having small elasticity. However, an elastic material, such as an elastic string or a spring cable, may also be used. In such a case, the movements of the hand generated when the operator 2 operates the mobile body 1 can be absorbed by the elasticity of the string body 8 itself. Therefore, the high-frequency components can be eliminated without using a filter.

The structure shown in FIG. 2 is simply an example, and the effects of the present invention can obviously be obtained also by a structure other than that shown in FIG. 2, such as a structure in which the rotational axis of the pulley 12 is rotated by 90° or a structure in which the arrangement of the rotational-angle detectors is changed. The present embodiment is based on the assumption that the operator 2 pulls the string body 8 in the plane in which the operating unit 7 is disposed. Therefore, if the operator 2 holds the string body 8 at a position higher or lower than the operating unit 7, the pull-out length of the string body 8 increases by an amount corresponding to the difference between the vertical positions. Although this does not cause a large problem in the operation of the mobile body 1, the operation accuracy can also be increased by additionally providing a measurement device that can measure an angle of elevation of the string body 8 and compensating for the difference between the vertical positions. Although the two-wheel differential drive method is described as an example in FIGS. 3 and 4, the present invention can obviously be applied to other types of wheel driving methods. Furthermore, the present invention can also be applied in a similar manner to devices for operating a mobile body without wheels, such as a biped walking device, a multi-leg walking device, a crawler device, or a flying device.

Fourth Embodiment

Figure 8:
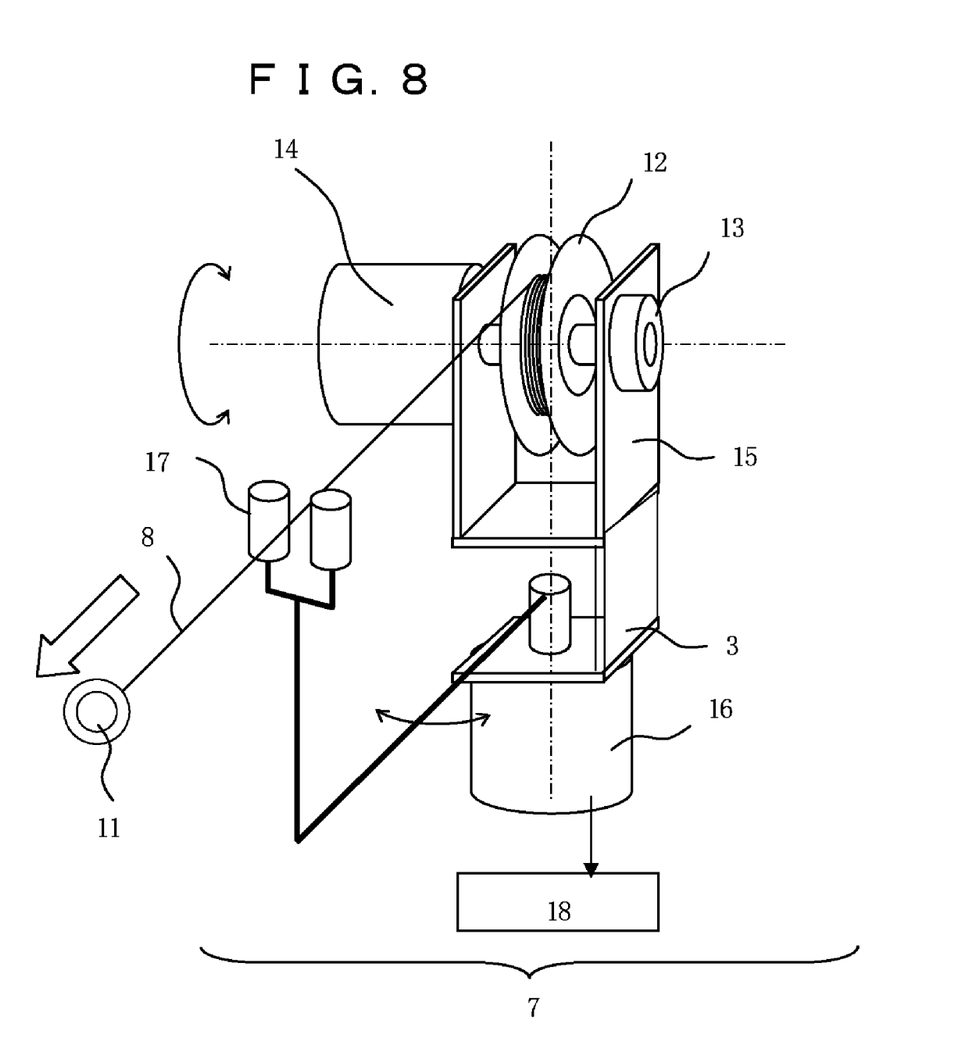
FIG. 8 illustrates the structure of an operating unit according to a fourth embodiment of the present invention.

FIG. 8 illustrates the structure of an operating unit 7 according to a fourth embodiment of the present invention. In FIG. 8, the structure of a length measurement device 9 including a pulley 12, a power spring 13, and a first rotational-angle detector 14 is similar to that in the first embodiment, and explanations thereof are thus omitted. The first rotational-angle detector 14 is fixed to a fixing part 15, and the fixing part 15 is attached to a portion of a main body 3. A guide 17 is fixed to the main body 3 such that the guide 17 is swingable in a horizontal direction. Portions of the guide 17 that come into contact with a string body 8 are separated from each other so as to sandwich the string body 8 from the left and right sides thereof, thereby restraining the string body 8 from being largely displaced leftward or rightward. The swing position of the entire body of the guide 17 can be measured by a second rotational-angle detector 16. The measurement value obtained by the second rotational-angle detector 16 is amplified and output by an amplifier 18 as an angle of the string body 8 with respect to the main body 3. The guide 17 and the second rotational-angle detector 16 constitute an angle measurement device 10.

Figure 9A:
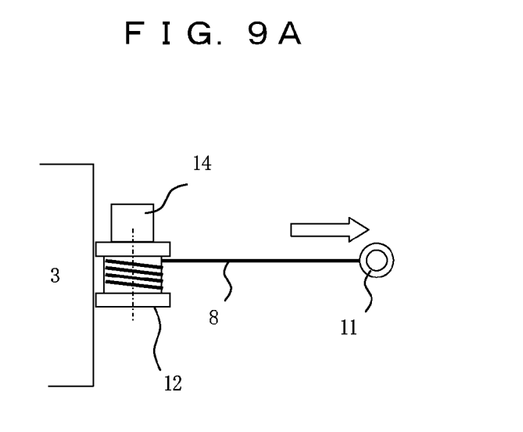
FIGS. 9A to 9D are top views illustrating the movements of a string body in an operating process.
Figure 9B:
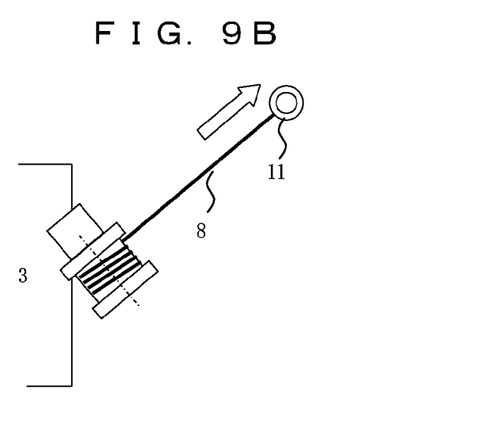
Figure 9C:
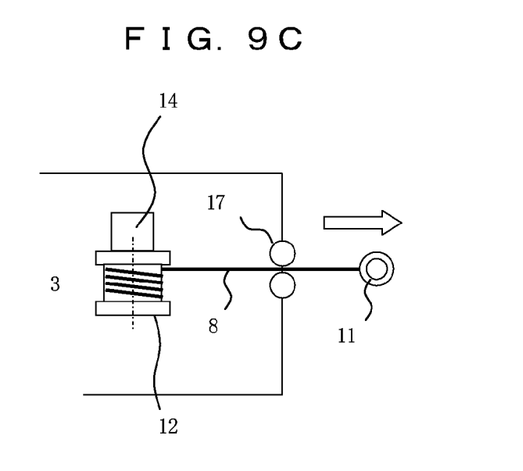
Figure 9D:
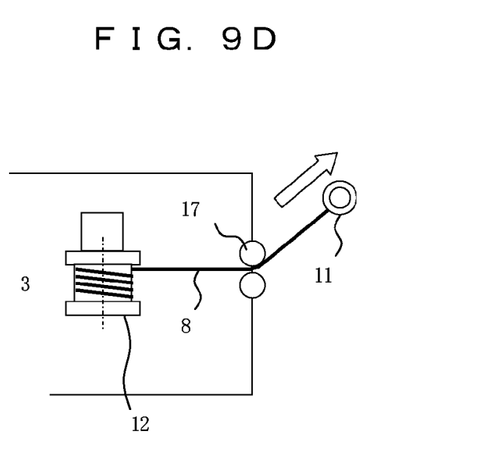

FIGS. 9A to 9D are top views illustrating the movements of the string body 8 in an operating process according to the first and fourth embodiments. FIG. 9A shows the state in which the handle 11 is pulled straight in the first embodiment, and FIG. 9B shows the state in which the handle 11 is pulled sideways in the first embodiment. As shown in FIGS. 9A and 9B, in the case where the handle 11 is pulled sideways, the overall body of the first rotational-angle detector 14 rotates about a vertical axis. Therefore, it is necessary to provide a large space at the outside of the main body 3. FIG. 9C shows the state in which the handle 11 is pulled straight in the fourth embodiment, and FIG. 9D shows the state in which the handle 11 is pulled sideways in the fourth embodiment. Since the guide 17 is provided, the string body 8 can be pulled out without causing the first rotational-angle detector 14 to rotate. Although the amount of swing of the guide 17 that can be measured by the second rotational-angle detector 16 is relatively small, the rotational angular velocities to be generated at the drive wheels 4a and 4b can be calculated on the basis of the amount of swing of the guide 17 since the amplifier 18 is provided. In the above-described structure, the first rotational-angle detector 14 can be placed in the main body 3. Therefore, the size of the movable portion on the surface of the main body 3 can be reduced.

Fifth Embodiment

Figure 10:
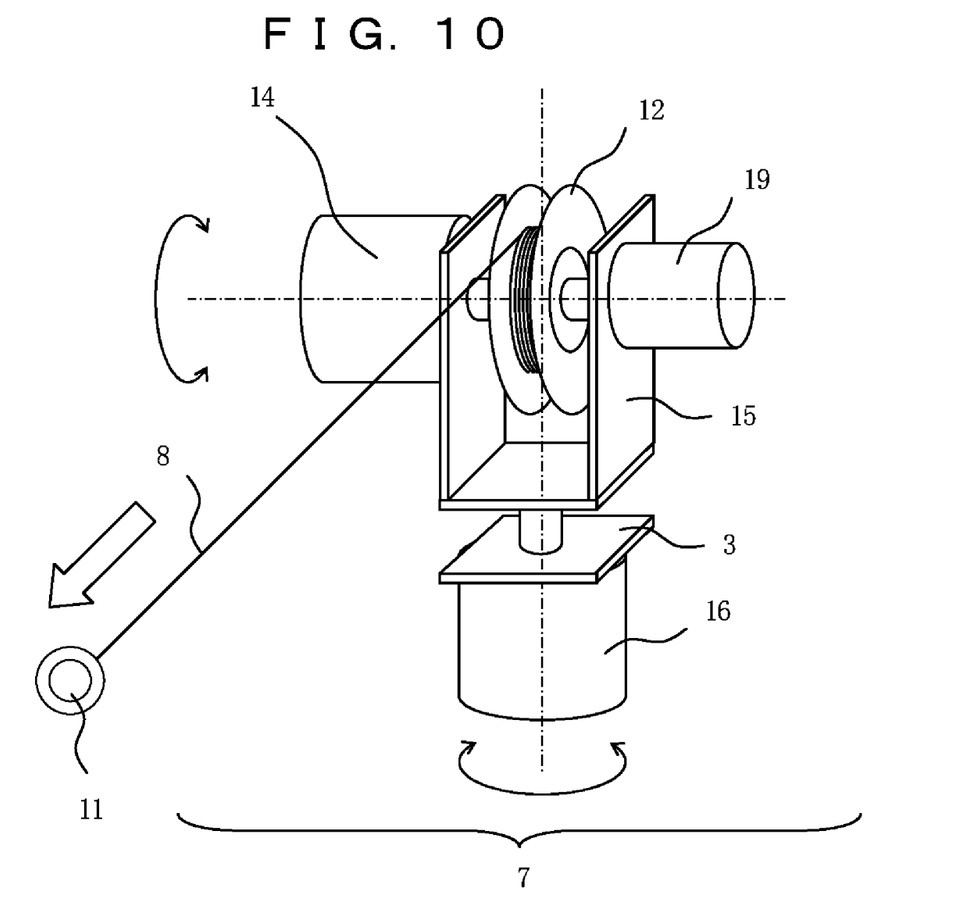
FIG. 10 illustrates the structure of an operating unit according to a fifth embodiment of the present invention.

FIG. 10 illustrates the structure of an operating unit 7 according to a fifth embodiment of the present invention. Referring to FIG. 10, a handle 11 is fixed to a string body 8 at an end thereof. The other end of the string body 8 is fixed to a pulley 12, and the string body 8 is wound around the pulley 12. A drive device 19 is capable of rotating the pulley 12 such that the string body 8 is wound around the pulley 12 or pulled out from the pulley 12. The rotational speed or the rotational angle (the rotational speed and the rotational angle) of the pulley 12 is detected by a first rotational-angle detector 14. The pulley 12, the drive device 19, and the first rotational-angle detector 14 constitute a length measurement device 9 for measuring a pull-out length by which the string body 8 is pulled out. The structure of a angle measurement device 10 including a fixing part 15 and a second rotational-angle detector 16 is similar to that in the first embodiment, and explanations thereof are thus omitted. In the above-described structure, the pulley 12 can be urged in a winding direction such that the tension applied to the string body 8 can be maintained at a suitable tension. In addition, the drive device 19 can also be controlled to apply a large tension to the string body 8, so that the operator can be pulled by the main body 3. Accordingly, various information can be presented to the operator. More specifically, in the case where an obstacle is detected by the main body 3, the main body 3 can strongly pull the string body 8 to warn the operator about the obstacle. Alternatively, the string body 8 may be pulled in a certain pattern when a trouble occurs, for example, when the remaining battery power is reduced. Thus, the operator can be informed of the situation.

Sixth Embodiment

Figure 11:
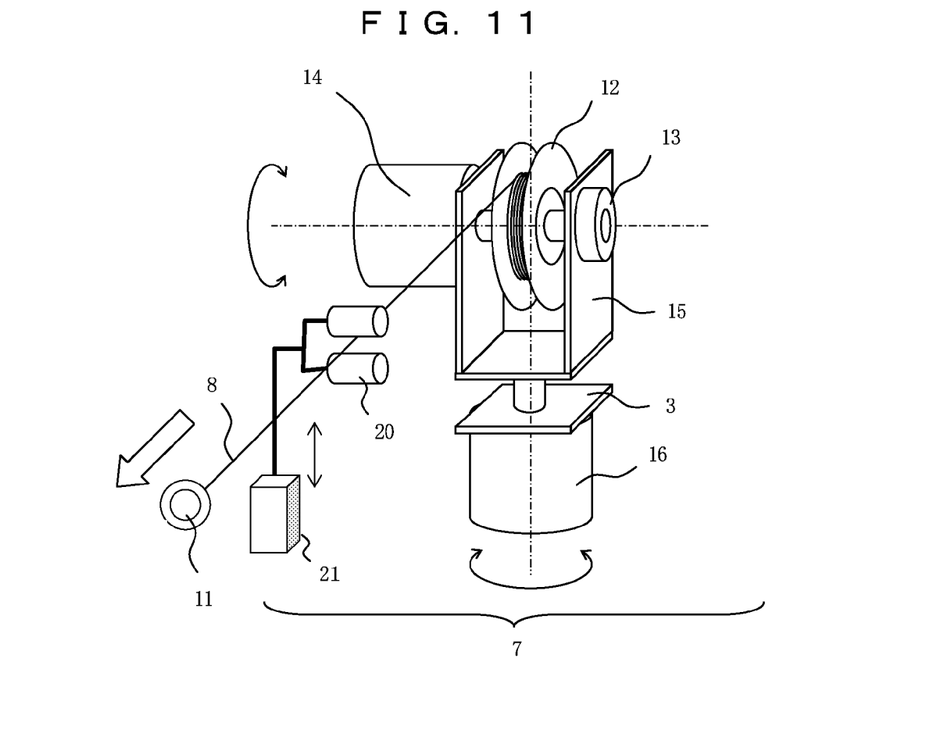
FIG. 11 illustrates the structure of an operating unit according to a sixth embodiment of the present invention.
Figure 12A:
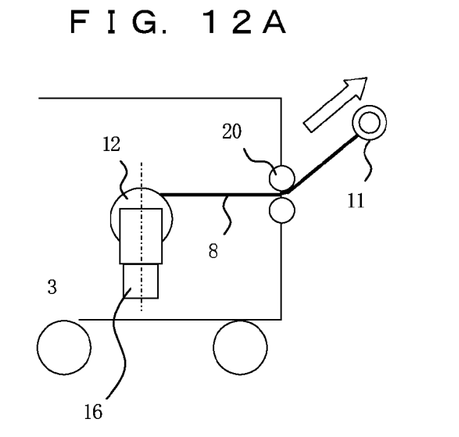
FIGS. 12A and 12B are side views illustrating an operating process according to the sixth embodiment.
Figure 12B:
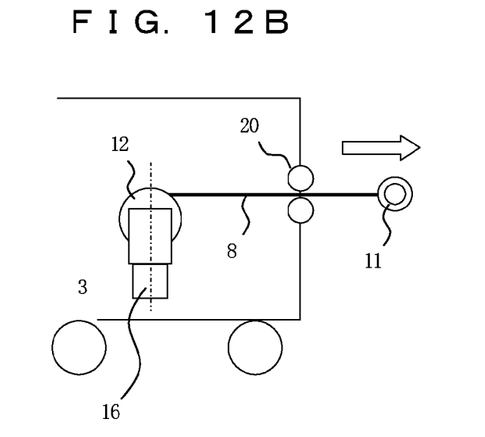

FIG. 11 illustrates the structure of an operating unit 7 according to a sixth embodiment of the present invention. Referring to FIG. 11, a second guide 20 is fixed to a main body 3 such that the second guide 20 is swingable in a vertical direction. Portions of the second guide 20 that come into contact with a string body 8 are separated from each other so as to sandwich the string body 8 from above and below, thereby restraining the string body 8 from being largely displaced upward or downward. The upward and downward movement of the second guide 20 can be detected by a vertical-movement detector 21. FIGS. 12A and 12B are side views illustrating an operating process according to the sixth embodiment. FIG. 12A shows the state in which the string body 8 is pulled upward with respect to the main body 3. The second guide 20 receives an upward force, and the vertical-movement detector 21 detects a vertical movement. In this state, the control unit 6 does not operate the drive unit 5, and stores the pull-out length L of the string body 8 as a neutral length L5. FIG. 12B shows the state in which the string body 8 is pulled horizontally straight. The second guide 20 does not receive an upward or downward force, and no vertical movement is detected by the vertical-movement detector 21. In this state, the control unit 6 operates the drive unit 5 such that the mobile body moves forward if the pull-out length of the string body 8 is longer than the stored pull-out length L5 and backward if the pull-out length of the string body 8 is shorter than the stored pull-out length L5. With this structure, the pull-out length of the string body 8 corresponding to the neutral point between the forward and backward movements can be easily set without using a switch provided on the handle 11 as in the second embodiment.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A mobile body comprising:
   a main body;
   a drive unit configured to drive the main body;
   an operating unit with which the main body is operated; and
   a control unit configured to control the drive unit on the basis of an amount of operation applied to the operating unit,
   wherein the operating unit includes
      a pulley around which a string body is wound,
      a power spring configured to urge the pulley in a direction such that the string body is wound around the pulley,
      a first rotational-angle detector configured to measure an amount of rotation of the pulley,
      a fixing part configured to fix the first rotational-angle detector, and
      a second rotational-angle detector configured to measure an amount of rotation between the fixing part and the main body, wherein the control unit includes
- the string body that can be pulled out from and retracted with respect to the main body,
- a length measurement device configured to measure a pull-out length by which the string body is pulled out, and
- an angle measurement device configured to measure an angle of the string body with respect to the main body, and wherein the control unit controls the drive unit on the basis of the results of the measurements performed by the length measurement device and the angle measurement device, and stops the drive unit if the string body is pulled out by a predetermined length or more.

2. The mobile body according to claim 1,
wherein the operating unit further includes
- a switch that can be operated by an operator at an end of the string body, and wherein the control unit stores a pull-out length of the string body at the time when the switch is depressed as a neutral point for a velocity of the main body.

3. The mobile body according to claim 1, wherein the length measurement device is stored in a handle to be held by an operator.

4. The mobile body according to claim 1, wherein the string body has elasticity.

5. The mobile body according to claim 1,
wherein the operating unit further includes
- a guide that is fixed to the main body such that the guide is vertically swingable and that comes into contact with the string body, and
- a vertical-movement detector configured to detect a vertical movement of the guide with respect to the main body, and wherein the control unit stops controlling the drive unit and stores a pull-out length of the string body as a neutral point for a velocity of the main body when the vertical-movement detector detects the vertical movement of the guide.

* * * * *